United States Patent [19]

Shintani et al.

[11] Patent Number: 4,564,493
[45] Date of Patent: Jan. 14, 1986

[54] METHOD OF MANUFACTURING A CASTING NOZZLE BRICK

[75] Inventors: Tsuneo Shintani, Kitakyushu; Soichi Kojima; Masuo Goto, both of Okayama, all of Japan

[73] Assignees: Kurosaki Refractories Co., Ltd., Kitakyushu; Kurosaki Rozai Co., Ltd., Bizen, both of Japan

[21] Appl. No.: 602,097

[22] Filed: Apr. 20, 1984

Related U.S. Application Data

[63] Continuation of Ser. No. 347,418, Feb. 10, 1982, abandoned.

[30] Foreign Application Priority Data

Feb. 13, 1981 [JP] Japan ................................. 56-19908
Jul. 10, 1981 [JP] Japan ................................ 56-107965
Jul. 10, 1981 [JP] Japan ................................ 56-111905

[51] Int. Cl.⁴ .......................................... B29D 23/04
[52] U.S. Cl. .................................. 264/209.1; 264/66; 264/328.1
[58] Field of Search .................... 264/209.1, 328.1, 66; 425/380, 381

[56] References Cited

U.S. PATENT DOCUMENTS 4,256,686  3/1981  Froschauer .................... 264/209.1
4,362,495 12/1982  Naito ............................. 264/209.1
4,364,783 12/1982  Theodore ....................... 264/209.1
4,373,895  2/1983  Yamamoto ..................... 264/209.1

Primary Examiner—Donald Czaja
Assistant Examiner—V. Fischbach
Attorney, Agent, or Firm—Fidelman, Wolffe & Waldron

[57] ABSTRACT

A composition of flake graphite, binder clay and a refractory material is extruded from an auger machine into a mold to form a cylindrical graphitic casting nozzle brick. The mold includes a coaxial core terminating short of an extrusion die of the auger machine, so that the graphitic casting nozzle brick as extruded has a longitudinal bore with one end closed, with transverse holes being subsequently defined through the nozzle brick across the bore adjacent to the closed end. As an alternative, a coaxial core may be connected to an extrusion screw of the auger machine to define an axial through bore in the casting nozzle brick as the latter is extruded.

7 Claims, 4 Drawing Figures

METHOD OF MANUFACTURING A CASTING NOZZLE BRICK

This application is a continuation of application Ser. No. 347,418, filed Feb. 10, 1982 now abandoned.

BACKGROUND OF THE INVENTION

1. Field of the Invention

The present invention relates to a method of manufacturing an extruded nozzle for casting molten metal therethrough and a composition for such an extruded nozzle.

2. Prior Art

Various casting nozzles or casting nozzle bricks such as long nozzles and immersion nozzles have recently found widespread use in the fields of continuous casting for steel and production of clarifying steel to prevent molten steel from being oxidized during casting operation. Known nozzles are composed of a large amount of graphite to render themselves resistant to spalling and corrosion, and are formed by rubber presses. While rubber pressing can exert uniform pressure on nozzles being formed, graphite layers tend to be displaced, and resulting nozzles are subjected to poor dimensional accuracy. The rate of production of such nozzles is low because a finishing process such as grinding and cutting is required to remove dimensional irregularities, with the result that the nozzles are relatively costly to fabricate.

Extrusion processes have also been employed for producing graphitic casting nozzles or nozzle bricks. One prior example is disclosed in Japanese Laid-Open Patent Publication No. 48-28329, published Apr. 14, 1973, in which a solid cylindrical body is first extruded, and then a through bore for passage of molten metal therethrough is defined after the cylindrical body has been baked. The disclosed process requires complex manufacturing steps and hence produces casting nozzle bricks at a retarded rate.

A graphitic casting nozzle brick is known which has an axial bore with one end closed and which includes lateral holes defined through the nozzle across the bore adjacent to the closed end. A conventional method of fabricating such a casting nozzle brick has been to form a cylindrical body having a through bore and then to close off one end of the bore with an end cover. Such a prior method is disadvantageous, however, in that the nozzle is likely to crack at a junction where the end cover is joined to the cylindrical body at the time of baking or use.

Another known type of casting nozzle brick comprises a cylindrical body having an axial through bore, and is formed by an auger or extrusion machine having a central core attached by a beam to an extrusion die for defining the through bore. As a material to be extruded is forced to flow through the extrusion die, the material is cut and separated by the beam and then reunited past the beam into an extruded mass. No problem would arise out of the extrusion process when producing nozzles which have no or little graphite content. However, those nozzles which contain an increased amount of graphite and are fabricated by such an extrusion process are apt to crack along the surface of rejoining after the nozzles have been baked, especially when subjected to a thermal shock while in use.

SUMMARY OF THE INVENTION

According to a method of the present invention, a mold having a central core therein is connected to an extrusion die of an auger machine with the central core terminating short of the extrusion die, and a material is extruded through the extrusion die into the mold to form a casting nozzle brick therein which has a longitudinal bore defined by the central core with one axial end of the bore closed. Thereafter, the central core is removed from the mold, the formed casting nozzle brick is taken from the mold, the removed casting nozzle brick is dried and baked, and subsequently transverse holes are defined through the casting nozzle brick across the longitudinal bore adjacent to the closed axial end. According to another embodiment, a central core is coaxially coupled to an extrusion screw of an auger machine with a mold connected to an extrusion die of the auger machine, the central core extending through the extrusion die into the mold, and a material is extruded through the extrusion die into the mold to form a casting nozzle brick therein which has a longitudinal through bore defined by the central core. A composition suitable for such an extruded casting nozzle brick comprises flake graphite in an amount ranging from 10 to 40% by weight, the flake graphite being composed of granules each having a diameter in the range of from 0.1 to 0.5 mm, binder clay in an amount ranging from 10 to 30% by weight, and a refractory material in an amount equal to the remaining weight percent, the percentages being based on the combined weight of the three.

It is an object of the present invention, therefore, to provide a method of manufacturing graphitic casting nozzle bricks at a high rate of production and a low cost.

Another object of the present invention is to provide a method of manufacturing graphitic casting nozzle bricks which are resistant to cracking upon baking or in use.

Still another object of the present invention is to provide a method of manufacturing graphitic casting nozzle bricks which are of high dimensional accuracy and hence which require no subsequent finishing.

A still another object of the present invention is to provide a composition for extruded graphitic casting nozzle bricks which is suitable for being extruded and can withstand erosive attack from molten metal.

The above and other objects, features and advantages of the present invention will become more apparent from the following description when taken in conjunction with the accompanying drawings in which some preferred embodiments are shown by way of illustrative example.

DETAILED DESCRIPTION OF THE PREFERRED EMBODIMENTS

Figure 1:
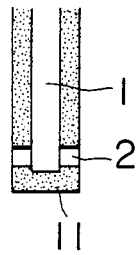
FIG. 1 is a longitudinal cross-sectional view of an immersion nozzle fabricated in accordance with a method of the present invention.

As shown in FIG. 1, an immersion nozzle manufactured according to a method of the present invention has a longitudinal axial bore 1 for passage therethrough of molten metal such as steel, the bore 1 being closed off at an end 11 thereof, and lateral holes 2 defined through the nozzle across the bore 1 adjacent to the closed end 11 for allowing molten steel to flow out of the bore 1.

Figure 2:
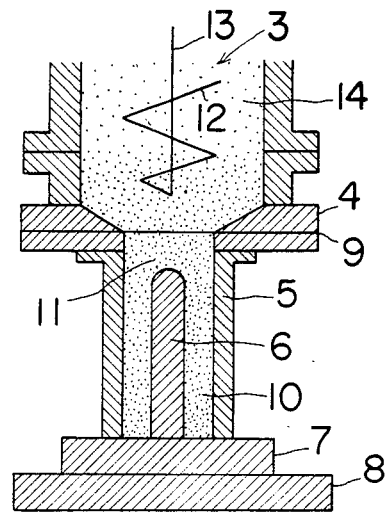
FIG. 2 is a longitudinal cross-sectional view of an auger machine with a mold attached thereto.

According to the present invention, the closed end 11 is formed simultaneously with the formation of the bore 1. FIG. 2 illustrates an auger or extrusion machine 3 for manufacturing such an immersion nozzle. The auger machine is of the type capable of two-stage deaeration and comprises an extrusion screw 12 mounted on a screw shaft 13 and housed in an extrusion barrel, and an extrusion die 4 attached to the extrusion barrel and having a central extrusion orifice. A cylindrical mold 5 is attached to the extrusion die 4 in coaxial relation therewith and has therein an elongate central core 6 terminating short of the extrusion die 4. The mold 5 and the central core 6 are mounted on a lower plate 7 on a table 8.

In operation, a material or body 14 to be extruded is forced upon rotation of the extrusion screw 12 through the extrusion die 4 into the mold 5 to form an immersion nozzle 10 therein. The lower plate 7 and the core 6 are removed, a withdrawal plate (not shown) is placed on the table 8, and then the immersion nozzle 10 as extruded is cut off from the material 14 in the extrusion barrel by a wire moving transversely in a plane 9 within the extrusion die 4. The table 8 is lowered to take the immersion nozzle 10 with one end 11 closed out of the mold 5. The immersion nozzle 10 thus formed is dried and baked in a conventional manner, and subsequently transverse holes 2 are defined therethrough across the longitudinal bore 1 adjacent to the closed end 11.

As an example, the material for producing the immersion nozzle 10 is composed of the following constituents:

TABLE 1

| Flake graphite | 20% by weight |
|---|---|
| Electrofused alumina | 55% by weight |
| Clay | 25% by weight |

An immersion nozzle which was fabricated according to the foregoing method of the present invention had the following properties:

TABLE 2

| Bulk specific gravity | 20.5 |
|---|---|
| Apparent porosity (%) | 25.0 |
| Crushing strength (Kg/cm$^2$) | 250 |

The above immersion nozzle was used on a 50-ton ladle for two charges of molten steel. After the use, no crack was found in the nozzle, and hence the nozzle proved capable of withstanding erosive attack from the molten steel.

According to another embodiment in case of a long nozzle, a central core is coaxially attached (not shown) to an extrusion screw of an auger machine, and a mold is connected to an extrusion die of the auger machine, with the central core extending through the mold. A material or body is extruded through the extrusion die into the mold to form a casting nozzle brick therein which has a longitudinal through bore therein defined by the central core.

The exemplary constituents of the material for fabricating such a casting nozzle brick are as follows:

TABLE 3

| Flake graphite | 15% by weight |
|---|---|
| Electrofused alumina | 35% by weight |
| Molten silica | 25% by weight |
| Clay | 25% by weight |

Figure 3:
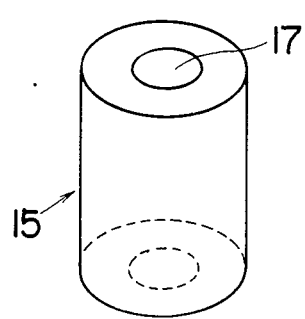
FIG. 3 is a perspective view of a casting nozzle brick fabricated according to another method of the present invention.
Figure 4:
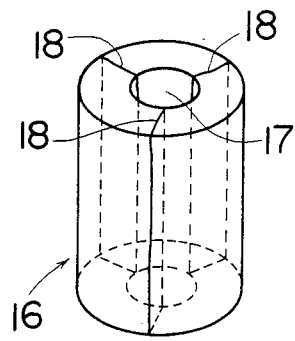
FIG. 4 is a perspective view of a conventional casting nozzle brick which is shown cracked in a spalling test.

Water or organic binders such as resin, paste or the like were added to the foregoing composite, and the mixture was kneaded. The mixture or body was extruded by the auger machine with the core coaxially attached to the extrusion screw and by a conventional auger machine with a core supported by a beam on an extrusion die, to thereby form cylindrical casting nozzle bricks 15, 16, as shown in FIGS. 3 and 4, respectively, each having a central through bore 17. These casting nozzle bricks 15, 16 were heated quickly up to 1,400° C. and kept at that temperature for 15 minutes, and then water-cooled for two minutes and air-cooled for 13 minutes. Such a spalling test procedure was repeated until the nozzles are cracked. The results of the spalling test are given in Table 4, and FIGS. 3 and 4.

TABLE 4

| Casting nozzle brick 15 of the invention | No cracks developed after the test procedure was repeated five times. |
|---|---|
| Conventional casting nozzle brick 16 | Cracked in a single spalling test procedure. |

The casting nozzle brick 15 was not cracked after repeated test procedures as shown in FIG. 3, but the casting nozzle brick 16 showed cracks 18 in a single spalling test procedure as shown in FIG. 4.

In the body in molding, graphite has a difficulty in getting wet with a medium such as water, and cannot easily be deaerated. The auger machine used however, can effect vacuum deaeration on graphite, and better results such as lamination prevention and compact structure can be obtained by two-stage deaeration though one-stage deaeration serves the purpose. Properties available by one-stage and two-stage deaeration processes are shown in Table 5.

TABLE 5

| | Two-stage deaeration | One-stage deaeration |
|---|---|---|
| Bulk specific gravity | 2.00 | 1.95 |
| Apparent porosity (%) | 25.0 | 29.0 |
| Crushing strength (Kg/cm$^2$) | 200 | 180 |

The properties in Table 5 belong to a casting nozzle brick which has been molded and baked. The number of stages of deaeration corresponds to the number of vacuum deaeration mechanisms of the auger machine.

A long nozzle, which was fabricated with the above two-stage deaeration, was used on a 50-ton ladle for two charges of molten steel. No cracks showed in the nozzle, and hence the nozzle was found to be able to withstand erosive attack from the molten steel.

With the methods of the present invention, nozzles can easily be flanged while being molded and fabricated to a dimensional nicety with no finishing process required. Also, the nozzles can be manufactured successively at a high rate of production and a low cost.

It is known that where nozzles contain much graphite, their properties are greatly influenced by the arrangement of graphite layers. More specifically, anisotropy of graphite, or especially flake graphite, has a great effect on thermal conductivity, a coefficient of thermal expansion, electrical conductivity, acidproofing capability, erosion resistivity, and mechanical strength of nozzles made of graphite. With such anisotropy in view, the extrusion processes of the present invention are designed to arrange graphite layers in concentric planes in casting nozzle bricks extruded.

Formability of the constituents of a material, with a carbon content, to be extruded into a casting nozzle brick governs a surface finish and lamination of the casting nozzle brick, and the degree by which the material fills the mold. A composition for extruded graphitic casting nozzle bricks according to the present invention is selected so as to be suitable for extrusion processes while keeping required quality and practical feasibility of casting nozzle bricks.

A variety of compositions were prepared and tested for their properties as they are extruded into casting nozzle bricks, the results being shown in Table 6, in which examples 2 through 4 are prepared according to the present invention.

comes worse as the bulk specific gravity is reduced, the porosity increased, and the crushing strength reduced.

Graphite should preferably be in the range of from 10 to 40% by weight. With 10 weight % or less of graphite, casting nozzle bricks made thereof are subjected to less erosion and spalling resistance. With 40 weight % or more of graphite, the ability for casting nozzle bricks formed thereof to retain their extruded shape is lowered, and lamination is liable to form.

Clay should preferably range from 10 to 30% by weight. Where clay is of 10 weight % or below, casting nozzle bricks have a smaller ability to hold in shape, and lamination can easily form. Where clay is of 30% by weight or more, erosion and spalling resistivities are reduced.

A long nozzle made of a composition according to the example 3 of Table 6 was used on a 50-ton ladle for two charges of molten steel. The long nozzle exhibited no crack, and hence was found to be able to withstand erosive attack from the molten steel.

Although certain preferred embodiments have been described in detail, it should be understood that many changes may be made therein without departing from the appended claims.

What is claimed is:

TABLE 6

| Example No. | 1 | 2 | 3 | 4 | 5 | 6 | 7 | 8 | 9 |
|---|---|---|---|---|---|---|---|---|---|
| Flake graphite with granule diameter of 0.5 mm or more | | | | | | 15 | | | |
| Flake graphite with granule diameter of 0.5 to 0.1 mm | 5 | 10 | 20 | 40 | 45 | | | 15 | 15 |
| Flake graphite with granule diameter of 0.1 mm or less | | | | | | | 15 | | |
| Clay | 25 | 25 | 25 | 25 | 25 | 25 | 25 | 5 | 35 |
| Refractory aggregate | 70 | 65 | 55 | 35 | 30 | 60 | 60 | 80 | 50 |
| Formability | good | good | good | slightly good | bad | bad | bad | bad | good |
| Surface finish | good | good | good | good | slightly good | bad | bad | bad | good |
| Lamination | none | none | none | none | formed | formed | slightly formed | formed | none |
| *Bulk specific gravity | 2.10 | 2.05 | 2.00 | 1.87 | 1.85 | 1.96 | 1.95 | 2.03 | 2.02 |
| *Apparent porosity (%) | 21.0 | 23.0 | 25.0 | 26.0 | 28.0 | 28.0 | 29.0 | 28.0 | 24.0 |
| *Crushing strength (Kg/cm$^2$) | 350 | 300 | 250 | 200 | 180 | 150 | 130 | 100 | 250 |
| **Spalling resistivity | — | 5 times | 5 times | 5 times | 5 times | — | — | — | twice |

*After the casting nozzles have been molded and baked.
**The casting nozzle bricks were heated at 1,400° C. for 15 min., water-cooled for 2 min., and air-cooled for 13 min.

To the composites in Table 6 are added water, and the mixture is kneaded before being extruded into casting nozzle bricks by the auger machine.

Where clay is on the order of 10% by weight, an organic binder such as resin, paste or the like should be added for better formability.

The results in Table 6 indicate that the amount of clay used and the diameter of graphite granules constitute controlling factors for the properties of casting nozzle bricks. A preferable range of diameters of graphite granules is from 0.1 to 0.5 mm. Where the diameter is 0.5 mm or larger, formability is poor as lamination tends to appear and the surface finish gets worse. Where the diameter is 0.1 mm or smaller, formability is poor as the volume of materials to be combined is increased and the constituents are less bound together, and quality be- 1. A method of manufacturing a graphitic casting nozzle brick using an auger machine having an extrusion screw and an extrusion die, comprising the steps of:
providing a mold connected to the extrusion die and including a central core therein which terminates short of said extrusion die;
extruding a mass of graphitic material through said extrusion die into said mold without separating and rejoining said mass during said extruding and after leaving contact with said screw and prior to contact with said core and forming a graphitic casting nozzle brick therein which has a longitudinal bore defined by said central core with one axial end of the bore closed, wherein said graphitic material is a mixture comprising graphite in an amount of at least 10% by weight; and providing at least one stage of deaeration in said auger machine and dearating said graphitic material thereby in order to prevent lamination and enhance compact structure of said nozzle.

2. A method according to claim 1, including the steps of:
removing said central core from said mold;
taking the formed graphitic casting nozzle brick out of said mold;
drying and baking the graphitic casting nozzle brick; and
subsequently defining transverse holes through the graphitic casting nozzle brick across said longitudinal bore adjacent to said closed axial end.

3. A method of manufacturing a graphitic casting nozzle brick using an auger machine having an extrusion screw and an extrusion die, comprising the steps of:
providing a central core coaxially coupled to the extrusion screw;
extruding a graphitic material through said extrusion die to form a graphitic casting nozzle brick having a longitudinal through bore therein defined by said central core, wherein said graphitic material is a mixture comprising graphite in an amount of at least 10% by weight; and
providing at least one stage of deaeration in said auger machine and deaerating said graphitic material thereby in order to prevent lamination and enhance compact structure of said nozzle.

4. A method as in claim 1, wherein said graphitic material comprises:
a mixture comprising an amount of graphite in the range of about 10% by weight to about 40% by weight in order to retain an extruded shape of said nozzle and to resist erosion and spalling and lamination thereof.

5. A method as in claim 3, wherein said graphitic material comprises:
a mixture comprising an amount of graphite in the range of about 10% by weight to about 40% by weight in order to retain an extruded shape of said nozzle and to resist erosion and spalling and lamination thereof.

6. A method as in claim 4, wherein said graphitic material comprises:
flake graphite in an amount ranging from 10% to 40% by weight, said flake graphite being composed of granules each having a diameter in the range of from 0.1 to 0.5 mm;
binder clay in an amount ranging from 10 to 30% by weight; and
a refractory material in an amount equal to the remaining weight percent, said percentages being based on the combined weight of the three in order to enhance formability and surface finish and further enhance retention of extruded shape, and resistance to erosion, spalling, and lamination.

7. A method as in claim 5, wherein said graphitic material comprises:
flake graphite in an amount ranging from 10 to 40% by weight, said flake graphite being composed of granules each having a diameter in the range of from 0.1 to 0.5 mm;
binder clay in an amount ranging from 10 to 30% by weight; and
a refractory material in an amount equal to the remaining weight percent, said percentages being based on the combined weight of the three in order to enhance formability and surface finish and further enhance retention of extruded shape, and resistance to erosion, spalling, and lamination.

* * * * *